(No Model.) 5 Sheets—Sheet 1.

T. WEISSER.
CONTROL APPARATUS FOR THE POSITION OF SIGNAL DISKS.

No. 461,657. Patented Oct. 20, 1891.

Witnesses:
James F. Duhamel
Horace A. Dodge

Theodor Weisser,
Inventor,
by Dodge Sons,
Attys.

(No Model.) 5 Sheets—Sheet 2.

T. WEISSER.
CONTROL APPARATUS FOR THE POSITION OF SIGNAL DISKS.

No. 461,657. Patented Oct. 20, 1891.

Witnesses:
James F. Duhamel
Horace A. Dodge

Theodor Weisser,
Inventor
by Dodge & Sons,
Attys.

THE NORRIS PETERS CO., PHOTO-LITHO., WASHINGTON, D. C.

(No Model.) 5 Sheets—Sheet 3.
T. WEISSER.
CONTROL APPARATUS FOR THE POSITION OF SIGNAL DISKS.
No. 461,657. Patented Oct. 20, 1891.
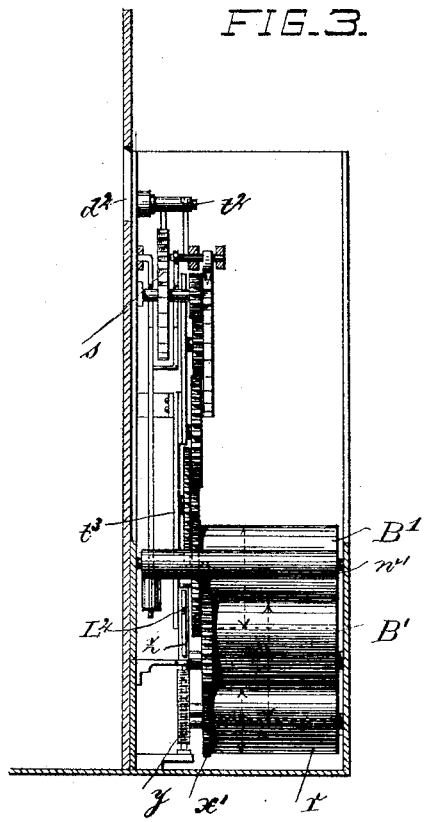
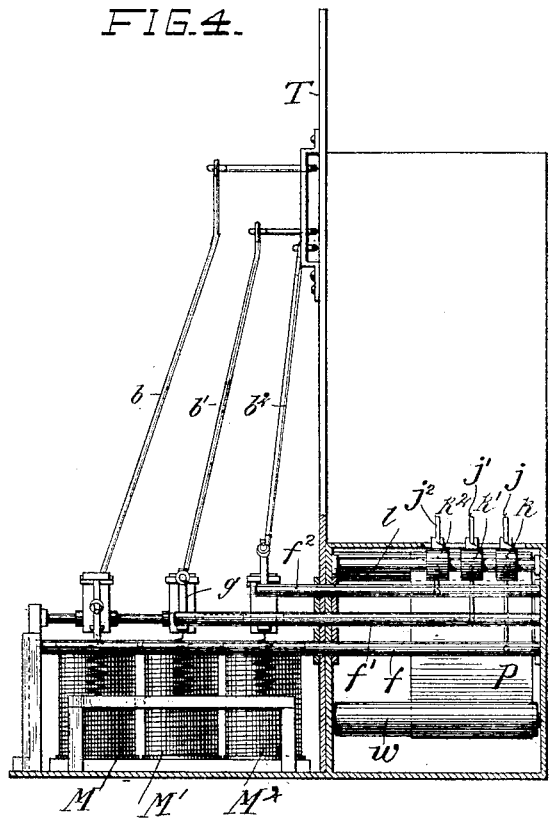
Witnesses:
James F. Duhamel
Horace A. Dodge
Theodor Weisser,
Inventor
by Dodge Sons, Attys.

(No Model.) 5 Sheets—Sheet 4.
T. WEISSER.
CONTROL APPARATUS FOR THE POSITION OF SIGNAL DISKS.
No. 461,657. Patented Oct. 20, 1891.

Witnesses:
James F. Duhamel
Horace A. Dodge

Theodor Weisser,
Inventor
By Dodge Sons,
Attys (No Model.) T. WEISSER. 5 Sheets—Sheet 5.
CONTROL APPARATUS FOR THE POSITION OF SIGNAL DISKS.
No. 461,657. Patented Oct. 20. 1891.
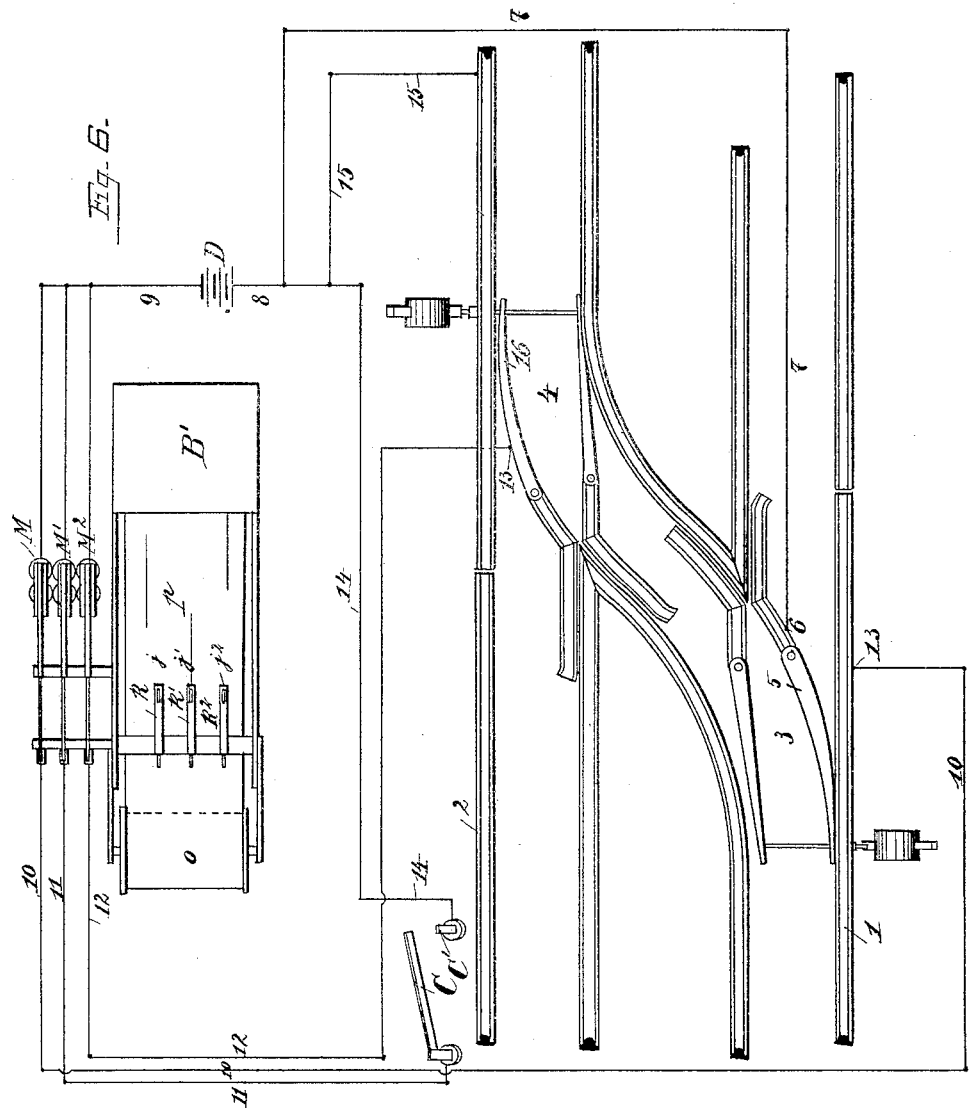

UNITED STATES PATENT OFFICE.

THEODOR WEISSER, OF VÖHRENBACH, GERMANY.

CONTROL APPARATUS FOR THE POSITION OF SIGNAL-DISKS.

SPECIFICATION forming part of Letters Patent No. 461,657, dated October 20, 1891.

Application filed November 29, 1889. Serial No. 332,005. (No model.)

*To all whom it may concern:*

Be it known that I, THEODOR WEISSER, of Vöhrenbach, in the Grand Duchy of Baden and German Empire, have invented a new and useful Control Apparatus for the Position of Signal-Disks, of which the following is a specification, reference being had to the accompanying drawings.

The controlling apparatus of the nature hereinafter described has for its object to verify at a distance the momentary position or placing of a certain device—for instance, a switch, a toll-gate, a railway-gate, &c.—and to indicate the period and length of time the said device has been in one or the other position. The signals are shown on a table provided with colored disks or lanterns, and they are simultaneously registered on a strip of paper divided into the different parts of time and driven by a clock-work. The marks upon the registering-strip are effected by a pencil, so that it will give a record upon the closing of the switch or gate at a given period.

The invention is represented in the accompanying drawings, in which—

Figure 1:
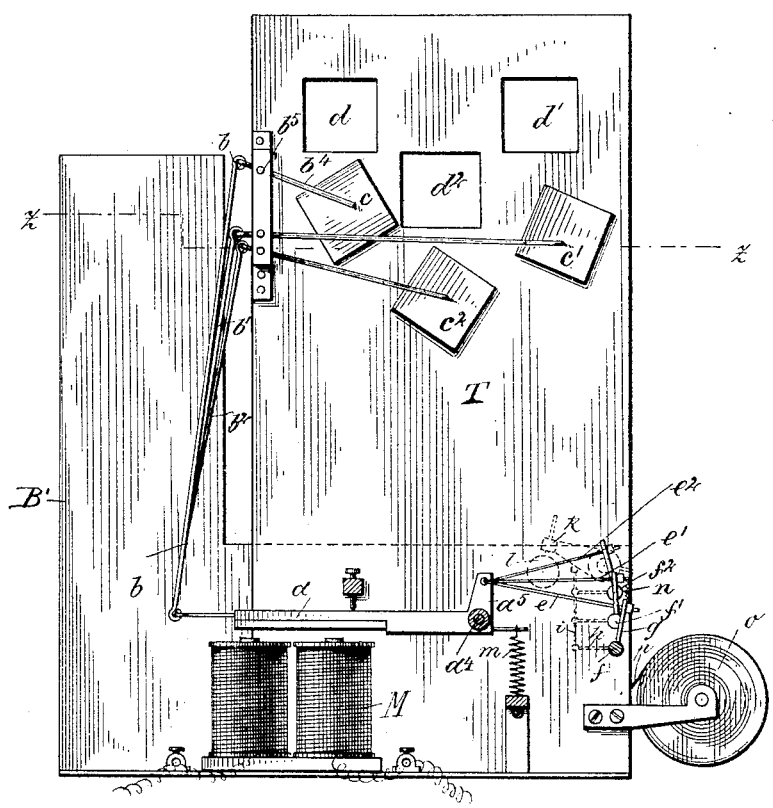
Figure 2:
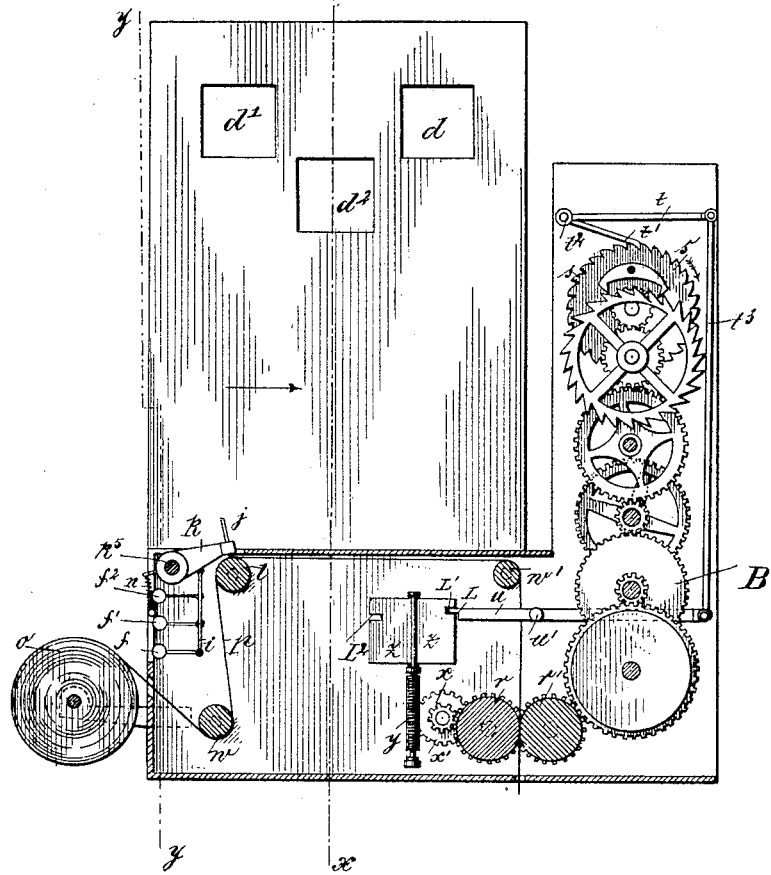
Figure 5:
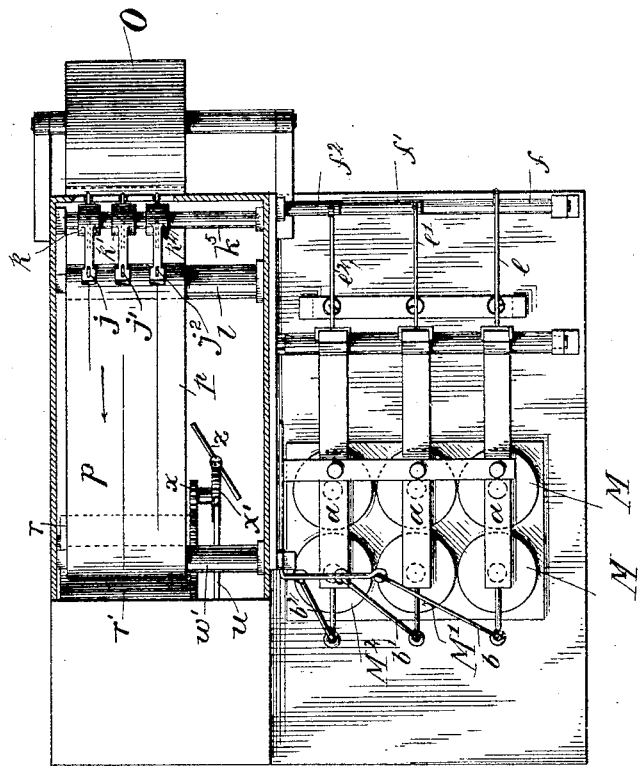

Figure 1 is a side elevation of the controlling apparatus seen from behind. Fig. 2 is a section through the clock-work of the apparatus, showing also the signal-table in front elevation and the writing device. Fig. 3 is a cross-section through the apparatus, showing the clock-work in elevation on line $x\ x$ of Fig. 2 and seen in the direction of the indicated arrow. Fig. 4 is a section on line $y\ y$ of Fig. 3. Fig. 5 is a horizontal section through the controlling apparatus on line $z\ z$ of Fig. 1; and Fig. 6 shows, diagrammatically, the device of a switch and of a railway-gate provided with the present invention.

The controlling apparatus is so arranged that by changing the position of a device which is connected with it an electric current is closed or opened. The current in passing through an electro-magnet attracts its armature, which produces a double effect: First, a disk is brought before the opening of the table, and, second, a pencil connected to the armature by means of a lever is pressed against a paper strip constantly drawn along by means of a clock-work, so that a line is formed on the paper. As this paper strip moves a certain distance in a certain length of time, it follows that the exact hour can be determined when the motion of the device (such as the switch) has been effected and how long the same has been in the changed position.

The drawings show a device with three magnets used during the operation of a switch and of a railway-gate.

I will first describe the invention with respect to the signal placing.

M, Fig. 1, is an electro-magnet to be energized by an electric current, as will be hereinafter specified. When the electro-magnet is energized, it attracts an armature $a$, causing the latter to turn on its pivot $a^4$ against the force of a spring $m$, hooked to frame T and holding the armature in its normal position. The front end of the armature $a$ is connected by the rod $b$ with a lever $b^4$, turning at $b^5$ and carrying at its end a signal-disk $c$. The said disk is placed before the opening $d$ of the table as soon as the armature $a$ is attracted, and thus a colored signal is lifted in sight.

In order to register the changed position of the signal, I make use of the following device: The back end $a^5$ of the armature $a$ is connected by a rod $e$ with a lever $g$, keyed on a shaft $f$. This shaft $f$ enters the case of the registering apparatus and carries at its back end a link $i$, pressing against a lever $k$, turning on the shaft $k^5$, while the front end of the lever $k$ is provided with a pencil $j$ just above a roller $l$, as shown in Figs. 2, 4, and 5. The armature $a$ being attracted, shaft $f$ is so turned that the link $i$ is lowered to cause the pencil $j$ to rest upon the roller. When, on the contrary, the electro-magnet M is not energized and its armature $a$ is not attracted, the lever $k$, under the action of a spring $n$, will be drawn away from the roller $l$. A registering-strip $p$ is led over roller $l$, coming from the paper-roll $o$, and passes over the cylinders $w$, $l$, and $w'$ and between pressing-rollers $r\ r'$, which pull it along in a slow regular motion, regulated by an escapement device having the following construction: The cog-wheels on the rollers $r\ r'$, gearing together, are also in gear with the wheel $x$, keyed on the shaft of a worm-wheel $x'$, which drives the worm $y$, the shaft of which carries the fly $z$, provided with two notches $L'$ and $L^2$. The end L of a lever $u$, having its fulcrum at $u'$ and receiving an oscillatory motion, is made to pass alternately through the said notches $L'$ and $L^2$. A clock-work $B'$, indicating the time in the usual manner, imparts motion to a ratchet-wheel $s$, operating the end $t'$ of a knee-lever $t't$, having its fulcrum on the frame at $t^2$, the arm $t$ of lever $t't$ being connected with the lever $u$ by means of the rod $t^3$. By the revolution of wheel $s$ in the direction of the arrow shown in Fig. 2 the arm $t'$ will be alternately raised and lowered, thereby raising and lowering the end L of the lever $u$. When this lever is in the position shown in Fig. 2, the fly $z$ can pass and will make half a revolution till its opposite edge abuts against the end L of the lever $u$. Hereupon the end L of lever $u$, actuated by the knee-lever $t't$, will be lowered till it passes into the notch $L^2$ and the fly can again make a further half-revolution. The progress of the wheel $s$ for one tooth effects, therefore, half a revolution of the fly, and the rollers $r\ r'$ are pulling out a certain part of the registering-strip.

It is obvious that while the electro-magnet M is energized the pencil $j$ will produce a line on the registering-strip. The diagrammatical figure shows such lines, and indicates, also, how the apparatus is arranged for a double switch and for a railway-gate.

1 is a track, 2 the neighboring track, 3 one switch, and 4 the other switch. The shifter-blade 5 of the switch 3 is connected at 6 with the wire 7 8, leading to a battery D, which is connected by a wire 9 with the electro-magnets M $M'$ $M^2$, over which the current passes to the conductors 10 11 12, through 10 to the rail 13 of the main track, and through 11 to the gate C, the post $C'$ of which is connected with the wire 8 by the wire 14. The conductor 12 is electrically connected at 23 to the shifter-blade 16.

The electro-magnets and the registering apparatus are everywhere of the same construction, and the above-explained device of controlling apparatus is the same for a switch as well as for a railway-gate.

Suppose that the switch 5 be so displaced that the main track 1 is connected with the adjacent track 2. An electrical contact will be effected between 13 and 5, and the current passes from the battery D through the conductors 8, 7, 6, 5, 13, and 10 to the electro-magnet M and through the wire 9 back to the battery. The electro-magnet is energized, the disk $c$ is placed in sight, and the pencil $j$ is allowed to drop down upon the strip of paper. If now the switch 4 is shifted in the secondary track, so as to form a connection between 2 and 16, the current will pass from the battery through 8, 15, 2, 16, 13, and 12, electro-magnet $M^2$, and wire 9 back to the battery. The electro-magnet $M^2$ then brings the signal-disk $c^2$ in sight, and the pencil $j^2$ marks the strip. Finally, when the gate C is closed, electric contact is established between C and $C'$, and the current passes from the battery D over 8, 14, $C'$, C, 11, and electro-magnet $M'$ back to the battery. The disk $c'$ will be shown on the table, and the pencil $j'$ is made to register.

Having thus described my invention, what I claim is—

A controlling apparatus for railway signals, switches, and the like, consisting of a clock-work $B'$, rotating the rollers $r$ and $r'$, which transport the paper strip $p$, in combination with the register-lever $k$, which is acted upon by the electro-magnet M and its armature $a$, which latter works simultaneously certain signal panes or plates $c\ c'$ on the show-table T, substantially as described.

In witness whereof I have hereunto set my hand in presence of two witnesses.

THEODOR WEISSER.

Witnesses:
PAULO SELDEN,
FELIX S. JOHNSON.